United States Patent [19]

Mahowald et al.

[11] Patent Number: 5,404,556

[45] Date of Patent: Apr. 4, 1995

[54] APPARATUS FOR CARRYING OUT ASYNCHRONOUS COMMUNICATION AMONG INTEGRATED CIRCUITS

[75] Inventors: Misha A. Mahowald, Oxford, England; Massimo A. Sivilotti, Encinitas, Calif.

[73] Assignee: California Institute of Technology, Pasadena, Calif.

[21] Appl. No.: 899,266

[22] Filed: Jun. 15, 1992

[51] Int. Cl.[6] .................. G06F 3/05; G06F 13/22; G06F 13/20; G06F 15/42

[52] U.S. Cl. .................. 395/800; 364/229.5; 364/230.5; 364/231.4; 364/237.8; 364/237.9; 364/239.7; 364/240.1; 364/270.5; 364/270.9; 364/274.9; 364/276.6; 364/DIG. 1; 364/DIG. 2; 395/21

[58] Field of Search ............. 395/800, 200, 24, 23, 395/21, 400, 425, 325, 250, 275, 375, 550, 500, 775, 725, 575, 700, 800.21, 22, 26, 27; 364/DIG. 1, DIG. 2

[56] References Cited

U.S. PATENT DOCUMENTS

| | | | |
|---|---|---|---|
| 4,126,893 | 11/1978 | Cronshaw et al. | 395/275 |
| 4,937,872 | 6/1990 | Hopfield et al. | 395/24 |
| 4,947,482 | 8/1990 | Brown | 364/807 |
| 5,053,638 | 10/1991 | Furatani et al. | 395/24 |
| 5,065,040 | 11/1991 | Peterson et al. | 395/24 |
| 5,093,900 | 3/1992 | Graf | 395/24 |
| 5,107,454 | 4/1992 | Niki | 395/24 |
| 5,115,492 | 5/1992 | Engleler | 395/24 |
| 5,131,072 | 7/1992 | Yoshizawa et al. | 395/24 |
| 5,191,649 | 3/1993 | Cadambi et al. | 395/200 |
| 5,202,956 | 4/1993 | Mashiko | 395/24 |
| 5,214,743 | 5/1993 | Asai et al. | 395/24 |
| 5,214,746 | 5/1993 | Fogel et al. | 395/23 |
| 5,218,703 | 6/1993 | Fleck et al. | 395/725 |

Primary Examiner—Alyssa H. Bowler
Assistant Examiner—Daniel H. Pan
Attorney, Agent, or Firm—D'Alessandro, Frazzini & Ritchie

[57] ABSTRACT

An apparatus for carrying out asynchronous communication among integrated circuits for inter-chip communications includes a plurality of senders disposed on an integrated circuit. Each is associated with send-initiate circuitry to indicate a request to send the occurrence of an event. The occurrence of an event causes the sender to transition from a no-event-occurred state to an event-occurred state. An address-generating circuit for generating a unique address is associated with each sender. The send-initiate circuitry of each sender is connected to an arbiter circuit. The arbiter circuit resolves simultaneous requests to send by more than one sender and provides a send-enable signal to the winning contending sender. The send-enable signal resets the selected sender to its no-event-occurred state. The send-enable signal causes the address-generating circuit associated with the winning contending sender to generate the address of that sender and place it on an output bus along with an output-enable signal. An acknowledge signal from a receiver resets the request-to-send signals from all send-initiate circuits. All other senders which reported an event and were not selected by the arbiter circuit remain in their event-occurred states. After the acknowledge signal, other pending events may be transmitted and the arbiter circuit again selects a sender from among any contenders.

1 Claim, 9 Drawing Sheets

APPARATUS FOR CARRYING OUT ASYNCHRONOUS COMMUNICATION AMONG INTEGRATED CIRCUITS

The present invention was made with support from the United States Government under Grant N00014-89-J-1675 awarded by the Department of the Navy. The United States Government has certain rights in the invention.

BACKGROUND OF THE INVENTION

1. Field of the Invention

The present invention relates to neural networks and VLSI technology. More particularly, the present invention relates to apparatus and methods for inter-chip communication of large numbers of events between multiple senders and receivers in silicon neural networks and the like over a limited I/O structure.

2. The Prior Art

Although the nervous system can perform many specialized tasks, at a gross level its primary function is to gather sensory data and to translate them into effective action. Animals learn from experience so that their responses become more appropriate. We hope to capture the essential nature of biological nervous systems by evolving our artificial system in a real-time sensorimotor context. Real-time sensorimotor processing as complex as that performed by the common house fly is unattainable even with today's fastest digital computers. The computational ability of the fly is incomparable to that of the digital computer because the principles of digital computation are fundamentally unlike those used in the nervous system. The computer reduces the information on its wires to 1 bit and combines the information in a sparsely connected array of logic gates. In contrast, neurons communicate in analog values and are richly interconnected.

CMOS VLSI is an analog electronic computational medium that has many properties in common with nervous tissue, and has the potential to achieve real-time sensorimotor processing. Although we are a long way from realizing an autonomous artificial neural system in this medium, we have made progress in key areas. Fast, high-density sensory processing and simple sensorimotor feedback systems now exist in CMOS. Analog computation allows these chips to perform complicated functions in real time. Some of these chips are able to modify themselves based on their past history. For example, a prior art adaptive retina adapts to a long time-average intensity to center itself in the correct operating range. Ideally, a system that incorporated real-time sensory and motor processing and on-chip learning will be able to learn directly from experience and optimize its own performance in a changing environment. In this application, one of the components of an analog neuron: the "axon", which is the means of communication between major functional units of a neural network, is disclosed.

Communication between neuronal elements is a principle limiting factor in the design of VLSI neuromorphic systems. This fact is not surprising considering that a large fraction of the nervous system is devoted to myelinated axons. The degree of convergence and divergence of single neurons is staggering in comparison with that in man-made computers. It might appear impossible, even in principle, to build such structures in VLSI circuits, which are limited to a virtually two-dimensional plane of silicon. Surprisingly, the cortices of the brain are nearly two dimensional as well. In fact, it has been shown that the degree of connectivity in a system whose wires occupy space cannot be markedly increased by employing a structure in which nodes are arrayed in three dimensions.

There is nothing fundamental about the structure of neural tissue that cannot be embedded in silicon. The thickness of cortical structures can be represented with a correspondingly larger silicon surface area. However, silicon surface area is available in small die, which are several millimeters on a side. The number of neurons that can be fabricated on a single die is therefore limited. Consequently, connections between silicon neurons located on different chips are essential for building even moderately sized artificial neural systems according to presently available technology.

The degree of connectivity and the real-time nature of neural processing demand different approaches to the problem of inter-chip communication than those used in traditional digital computers. VLSI designers have adopted several strategies for inter-chip communication in silicon neural networks. Each strategy has unique advantages and the choice of method depends on which factors are most crucial to the system.

One of the most literal approaches to interconnecting processing nodes has been adopted by Paul Mueller's group at the California Institute of Technology. Mueller uses a direct physical connection between nodes on different chips thorough a cross-bar switching array, One major advantage to this approach is that it allows continuous-time communication between nodes. In addition, the switching arrays provide flexible connectivity and can be programmed digitally by a host computer. The system is able to handle large connectivities because the dendrites of a single artificial neuron can be extended over multiple chips.

However, this approach requires many chips to model even a small number of neurons. The number of artificial neurons on each output chip is limited to roughly half the number of pins that are available. Currently available technology supports 84 pin grid arrays, and in the near future may be expected to be extended to 128. A further disadvantage of this design is that, in order to achieve a reasonable degree of matching between the analog performance of the different chips in the system, the transistors are used in their above threshold regime, where power dissipation is great.

Some applications, such as sensory transduction in which the silicon surface acts as a sensory epithelium, require many neurons to comprise locations on the same chip. The total number of neurons in such a structure exceeds the number of pins available for transmitting their outputs to off-chip targets. In this case, continuous time communication is sacrificed in order to time-multiplex the outputs of many neurons onto the small number of wires. The outputs of each neuron is sampled and transmitted for a brief time. The speed at which data can be transmitted determines the frequency above which information will be lost due to temporal aliasing.

Traditional multiplexing comprises serial access schemes. Each node is polled in sequence and its output sent off-chip. Each time slot is allocated to a particular node and the receiving device must by synchronized with the sending device in order to preserve the identity of the transmitting node. Most multiplexing schemes rely on a global clock to perform this synchronization. Global clock signals may be skewed to the point of dysfunction if the chips comprising the system are too far from each other.

The choice of multiplexing technique depends on how the neural elements in the system encode information. Some systems use analog-valued outputs, which encode several bits of information on a single wire. In analog multiplexed systems, the receiver chip samples the data stream and holds the data in a buffer until the next frame. This approach is particularly useful for interacting with video equipment as such equipment is designed to work with analog-valued image frames. However, analog data transfer is difficult between chips, in part because the analog data is easily perturbed by noise due to multiplexing. More importantly, the variations in the parameters of fabrication on different wafers means that different chips will have disparate interpretations of analog currents or voltages. These difficulties are avoided by transmitting digital amplitude signals.

Both synchronous and asynchronous techniques have been used to time-multiplex digital amplitude data. Digital signal transmission can be very fast because the settling time for an analog amplifier is avoided. Furthermore, digital signals are noise resistant and independent of variations in fabrication parameters. Synchronous transmission of multiple bits of information has the drawback that synchronously switching many elements injects noise on the power supply.

Asynchronous serial digital communication methods in which the duration of the digital pulse encodes several bits of information have been used. In this approach, the duration of the pulse is inversely proportional to the analog value of the output. Rather than using a global clocking mechanism to allocate specific time-slots to particular nodes, the identity of the sending neuron is determined by its position in the pulse stream. The node position is computed from the number of transitions in the stream itself. The pulse stream provides its own clock. The pulse stream techniques uses time to encode analog state, rather than to communicate explicitly temporal information.

BRIEF DESCRIPTION OF THE INVENTION

According to the present invention, an apparatus and a method for inter-chip communications, particularly adaptable to artificial neural systems and other systems which require communication of multiple events between a large number of senders and receivers is based on address-event representation. In a simple one-dimensional embodiment, a plurality of senders disposed on an integrated circuit are each associated with send-initiate circuitry to indicate a request to send the occurrence of an event. The senders may be a set of artificial neurons disposed on the integrated circuit and are configured to have two states, a first, no-event-occurred state, and a second event-occurred state. The occurrence of an event causes the sender to enter the event-occurred state.

An address-generating circuit for generating a unique address is associated with each sender. The send-initiate circuitry of each sender is connected to an arbiter circuit. The arbiter circuit resolves simultaneous requests to send by more than one sender and provides a send-enable signal to the winning contending sender. The send-enable signal resets the selected sender to its no-event-occurred state.

The send-enable signal causes the address-generating circuit associated with the winning contending sender to generate the address of that sender and place it on an output bus along with an output-enable signal. The output bus is coupled to a receiver integrated circuit or circuits which accepts the address on the bus in conjunction with the output enable signal as an indication of the occurrence of the event from the sender whose address is asserted on the bus and sends an acknowledge signal to the sending integrated circuit.

The acknowledge signal resets the request-to-send signals from all send-initiate circuits. All other senders which reported an event and were not selected by the arbiter circuit remain in their event-occurred states. The send-initiate circuits are configured such that their request-to-send signals are reasserted after the acknowledge signal. Thus, the acknowledge signal only resets the event-occurred state of the selected cell and hence in effect only permanently resets the request-to-send signal of the send-initiate circuit associated with the sender which has successfully transmitted its event to the output bus. After the acknowledge signal, other pending events may be transmitted and the arbiter circuit again selects a sender from among any contenders.

According to a two-dimensional embodiment of the present invention, an integrated circuit includes an array of rows and columns of senders, each having an associated send-initiate circuit including a common request-to-send line common to each sender in a row of the array and a common request to send line common to each sender in a column of the array. Row and column arbiter circuits are provided and operate sequentially.

If a sender experiences an event, it transitions to its event-occurred state and its associated send-initiate circuit places a request-to-send signal on the row request-to-send line to which it is connected. The row arbiter circuit selects a requesting row and places its Y-address on the data bus. The sender is then enabled to place a request-to-send signal on the column request-to-send line. The column arbiter circuit then selects a requesting column and places its X-address on the data bus. The completed address can then be decoded by the receiver. Signals indicating the selected row and column may be ANDed to reset the selected sender to its no-event-occurred state. After the receiver has accepted the data, it sends an acknowledge signal to reset the request-to-send signals from all send-initiate circuits. All other senders which reported an event and were not selected by the arbiter circuit remain in their event-occurred states. As in the one-dimensional embodiment, the acknowledge signal in effect only resets the request-to-send signal of the send-initiate circuit associated with the sender which has successfully transmitted its event to the output bus. After the acknowledge signal, other senders may transmit pending events and the arbiter circuit again selects a sender from among any contenders.

BRIEF DESCRIPTION OF THE DRAWINGS

FIG. 5b is a timing diagram for the circuit of FIG. 5a.

DETAILED DESCRIPTION OF A PREFERRED EMBODIMENT

Figure 1:
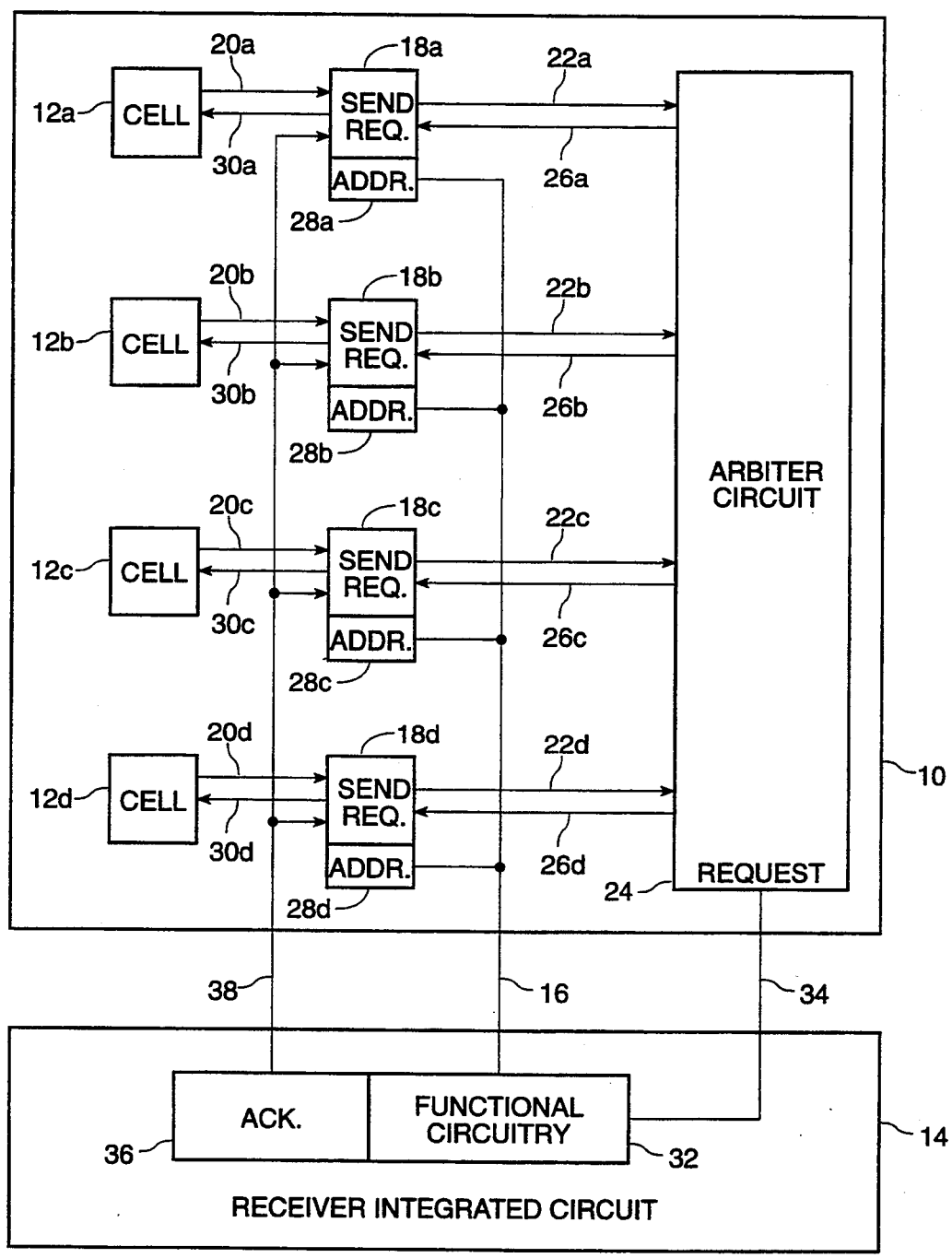
FIG. 1 is a block diagram illustrating an architecture comprising a one-dimensional array of event-generating cells configured to implement the inter-chip communication scheme of the present invention.

Those of ordinary skill in the art will realize that the following description of the present invention is illustrative only and not in any way limiting. Other embodiments of the invention will readily suggest themselves to such skilled persons.

The present invention includes unique features. First, it preserves as much as possible the timing of individual events. In addition, it uses an address-event data representation for neural action. Using this representation, the sending integrated circuit transmits the identities (addresses) of cells issuing action potential events, rather that literally transmitting the action potential as a pulse. The receiving integrated circuit decodes the address into an action potential.

Each cell in the network has a digital word as its address. At the time that a cell fires an action potential, its address is broadcast on a bus. The broadcast of the address is an event that corresponds to the generation of an action potential from the sending neuron. If several neurons try to generate action potentials simultaneously, an arbitration circuit decides which neuron controls the bus. After receiving an acknowledge signal, the arbiter removes the selected address from the bus and resets the state of the selected neuron. The neurons whose addresses were not broadcast continue to issue requests until they are acknowledged by the arbiter.

The address-event representation utilized in the presently preferred embodiment of the invention is designed to provide the high-bandwidth requirements of communication between large arrays of neuron elements. Time-multiplexing is the only way to transfer data from several thousand output nodes within the I/O pin limitations of existing VLSI technology. The premise underlying the address-event representation is that the channel bandwidth should be devoted to the transmission of significant signals. For example, a typical silicon retina in a typical application of the present invention may have a few thousand output nodes. Conventional video scanning techniques require that each node be sampled once every frame. Since the retina generates output only at areas in the image where there is spatial or temporal change in the image, most of the nodes will have almost no output, but are sampled anyway.

In contrast, the address-event protocol of the present invention is data driven. Only pixels that have something to report are transmitted over the data bus. Therefore, areas of uniform illumination do not contribute to the communication load. The asynchronous pulse stream technique suffers from the same problem as clocked serial scanning. In that method, it takes longer to transmit a small analog value than a significant one, so an image with little information takes longer to transmit than one with many interesting features. A further advantage of the address-event communications framework is that it minimizes temporal aliasing by transmitting events as they occur. It does not introduce the degree of sampling inherent in a sequential scanning technique. At low data rates, the bandwidth of the bus is completely devoted to accurate transmission of event timing.

The address-event representation provides a unifying framework for the construction of multi-chip systems. Digital-amplitude analog-time events have been used successfully in many silicon neuromorphic systems: auditory localization and pitch perception, electrolocation models, central pattern generators, sensory-motor systems, and prototype real-time learning systems. These existing chips could be easily integrated to form more complex systems by placing them in an address-event design frame. The use of a digital address to specify the identity of the sending neuron makes the mapping of presynaptic signals onto post-synaptic targets extremely flexible because the address-event carries its place of origin within itself. Unlike serial-scanning multiplexers, in which temporal order is easily confused with spatial position, the address-event can be easily decoded into any physical ordering on the receiving chip. The ordering can be specified when the chip is designed, particularly if the technique of silicon compilation is used to specify the design. Alternatively, the connectivity pattern can be specified dynamically when the chip is being operated by using static digital latches, in the latter case, specification of the mapping between input and output can be controlled by a host digital computer. The mapping of input to output is itself a complex computation in the nervous system and is a task more easily performed by computer than by hand wiring.

In addition to being well suited to inter-chip communication in silicon, the address-event multiplexing method bears a close resemblance to the action potential representation that is the common coinage of communication in the nervous system. It is likely that the underlying reasons are similar. An analog value is difficult to transmit when the ground potential is not the same everywhere in the system. The lack of a common ground is like the problem of transistor mismatch, which can be modeled to first order as an offset voltage on the transistor gate. Furthermore, the problem of dynamic noise on the axonal "wires" is ameliorated by using a strongly restored signal.

Referring first to FIG. 1, a block diagram illustrates an integrated circuit architecture comprising a one-dimensional array of neurons configured to implement the inter-chip communication scheme of the present invention. The integrated circuits described herein may be fabricated using standard CMOS fabrication processes. A transmitting integrated circuit 10, including a plurality of event-generating cells 12a–12d, communicates with a receiving integrated circuit 14 across an output bus 16. Each event-generating cell 12a–12d will be explained more fully herein with reference to FIG. 2, but may briefly be characterized by two states, a first no-event-occurred state and a second event-occurred state. Each event-generating cell is normally in its first state and makes a transition to its second state upon the occurrence of an event perceived by the cell.

Each event-generating cell 12a–12d in transmitting integrated circuit 10 has associated with it a send-initiate circuit 18a–18d with which it communicates on an event-pending line 20a–20d. Each of send-initiate circuits 18a–18d responds to the event-occurred state of its associated event-generating cell by changing a request-to-send signal output signal on request-to-send lines 22a–22d from a reset state to a set state, indicating a request to send information identifying the occurrence of an event.

Arbiter circuit 24 is connected to request-to-send lines 22a–22d of send-initiate circuits 18a–18d. The function of arbiter circuit 24 is to arbitrate between multiple pending requests to send from more than one event generating cell. Arbiter circuit 24 asserts a single select signal on one of select lines 26a–26d to the one of send-initiate circuits 18a–18d which has "won" the arbitration.

Each select signal is coupled to an address-generating circuit 28a–28d, which is coupled to output bus 16 and is capable of generating a unique address identifying the event-generating cell with which it is associated in response to the select signal. The assertion of the select signal causes the unique address identifying the winning event-generator cell to be placed on output bus 16. According to a presently preferred embodiment of the invention, the address signal may comprise a digital multi-bit parallel address signal.

According to the communication protocol of the present invention, the assertion of the select signal is also coupled to the selected cell via one of cell reset lines 30a–30d to cause the selected event-generating cell to reset to its no-event-occurred state. By accomplishing the reset function for the event-generating cell which has been selected to transmit prior to the termination of the data transfer cycle, repeated requests to transfer the same data are avoided. This allows for rapid and accurate communication of multiple simultaneous events, as will be apparent from the remainder of the disclosure herein.

The arbiter circuit 24 produces a request signal during a data transfer cycle, i.e., from the time a select signal is asserted to the "winning" event-generating cell until either the receiving integrated circuit acknowledges receipt of the data, or a timeout occurs. This request signal is asserted to functional circuitry 32 in the receiver integrated circuit 14 on request line 34. A receiving cycle is initiated by the assertion of the request signal on request line 34, and the functional circuitry 32 in receiving integrated circuit 14 then takes the incoming data from output bus 16. When the data has been captured by receiving integrated circuit 14, an acknowledge circuit 36 inside receiving integrated circuit 14 asserts an acknowledge signal on acknowledge line 38 to transmitting integrated circuit 10.

According to a presently preferred embodiment of the present invention, the acknowledge signal on acknowledge line 38 (or a timeout signal if a timeout has occurred first) is presented to each of send-initiate circuits 18a–18d. These circuits respond to the acknowledge signal resetting the request-to-send signal output signal on request-to-send lines 22a–22d from their set state. Once all request-to-send signals have been reset, the Request signal on line 34 is returned to its original no-request state and Acknowledge circuit 36 responds by removing the acknowledge signal from line 38.

After the acknowledge signal has terminated, any event-generating cells 12a–12d which have still-pending event-occurred states communicate to send-initiate circuits 18a–18d on event-pending lines 20a–20d by setting their request-to-send signal output signal on request-to-send lines 22a–22d from the reset state to the set state, indicating a continuing request to send information identifying the occurrence of an event.

Figure 2:
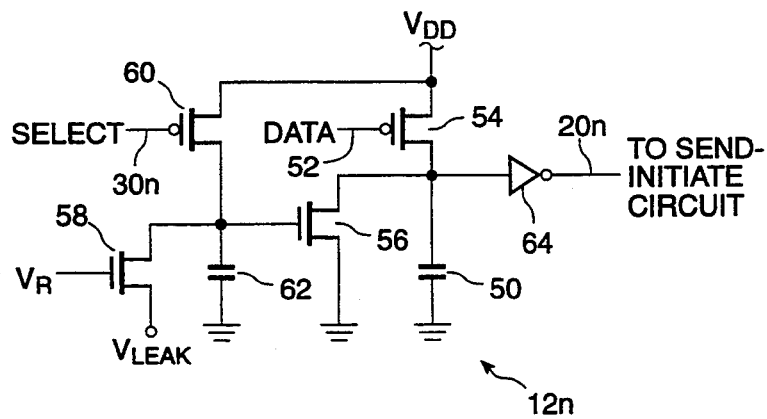
FIG. 2 is a schematic diagram of a typical event-generating cell which may be employed in the architecture of FIG. 1.

Referring now to FIG. 2, a presently preferred embodiment of event-generating cells 12a–12d is shown in schematic diagram form. The circuit of FIG. 2 is an analogue of the operation of biological neural systems. The action potential of a biological neuron is generated by two main currents, the sodium current and the potassium current. The sodium current is activated when the membrane voltage crosses a threshold level. It depolarizes the membrane and generates the rising phase of the voltage spike. The membrane is repolarized by the delayed potassium current. This function is captured abstractly by the basic circuit shown in FIG. 2.

The state variable of the basic event-generating cell 12n of FIG. 2 is the voltage set on capacitor 50. This state variable integrates the input data at the DATA input node 52 through P-channel MOS transistor 54 with a time constant set by the capacitance of capacitor 50 and N-channel MOS transistor 56 controlled by the voltage $V_{Leak}$ on the source of N-channel MOS transistor 58. Those of ordinary skill in the art will recognize that the DATA "signal" at the gate of P-channel MOS transistor 54 may be generated by one of any number of sources known to those skilled in the art of neuromorphic circuits.

The event-generating cell 12n may be reset by the application of a low-going SELECT signal from line 30n (one of lines 30a–30d from FIG. 1) at the gate of P-channel MOS transistor 60. The SELECT signal also makes the event-generating cell refractory for a time period set by refractory capacitor 62 and the refractory voltage $V_R$ at the gate of N-channel MOS transistor 58.

Normally, SELECT line 30n is high, turning off P-channel MOS transistor 60. N-channel MOS transistor 56 is turned on to an extent determined by the voltages $V_{LEAK}$ and $V_R$ which, through MOS transistor 58, determine the gate voltage of MOS transistor 56. When the DATA at the gate of P-channel MOS transistor 54 turns it on enough to overcome the leakage provided by transistor 56 and charge capacitor 50 to the threshold voltage of inverter 64, the neuron "fires" because inverter 64 changes state, its output going low. Its output will remain low until a SELECT signal on line 30n (derived from one of lines 26a–26d of FIG. 1) from arbiter circuit 24 at the gate of P-channel MOS transistor 60 turns that transistor on. With P-channel MOS transistor 60 turned on, the gate of N-channel MOS transistor 56 is charged to $V_{DD}$, thus turning transistor 56 on strongly to discharge capacitor 50.

According to a presently-preferred embodiment of the invention, the response of neuron cell 12n is made refractory for a time period set by the action of refractory capacitor 62 and N-channel MOS transistor 58. The SELECT signal, which on assertion rapidly discharges capacitor 50, is not removed until the acknowledge signal is received by the transmitting integrated circuit 10, indicating that the transmitted data has been received (or a timeout has occurred). Once the SELECT signal has been removed, capacitor 62 begins to discharge through N-channel MOS transistor 58 at the rate set by the voltages $V_R$ and $V_{LEAK}$. Since the voltage on refractory capacitor 62 controls the strength with which N-channel MOS transistor 56 is turned on, capacitor 50 will not be able to charge to a voltage above the threshold of inverter 64 again until the voltage at refractory capacitor 62 has settled to a quiescent value established by the voltages $V_R$ and $V_{LEAK}$ which allows the current through P-channel MOS transistor 54 to be larger than the current through N-channel MOS transistor 56. The current through N-channel MOS transistor 56 is similar to the delayed rectifier potassium current of the biological neuron in that it limits the maximum spike rate of the cell. The refractory period allows arbitration between coincident events to proceed more effectively than if neurons were allowed to fire at arbitrarily high firing rates. The maximum desirable refractory period considering multiplexing constraints alone is one that allows all of the events that could possibly occur simultaneously to be transferred in rapid succession, before any new event is generated by a cell which has already communicated its event. All of the cells are able to send all of their data if the refractory period of a cell is longer than the number of cells sharing the bus multiplied by the data transfer period. In order to guarantee that all the events will be transferred, addresses must be transferred faster than the maximum output event frequency of the cell multiplied by the number of cells in the array.

Figure 3:
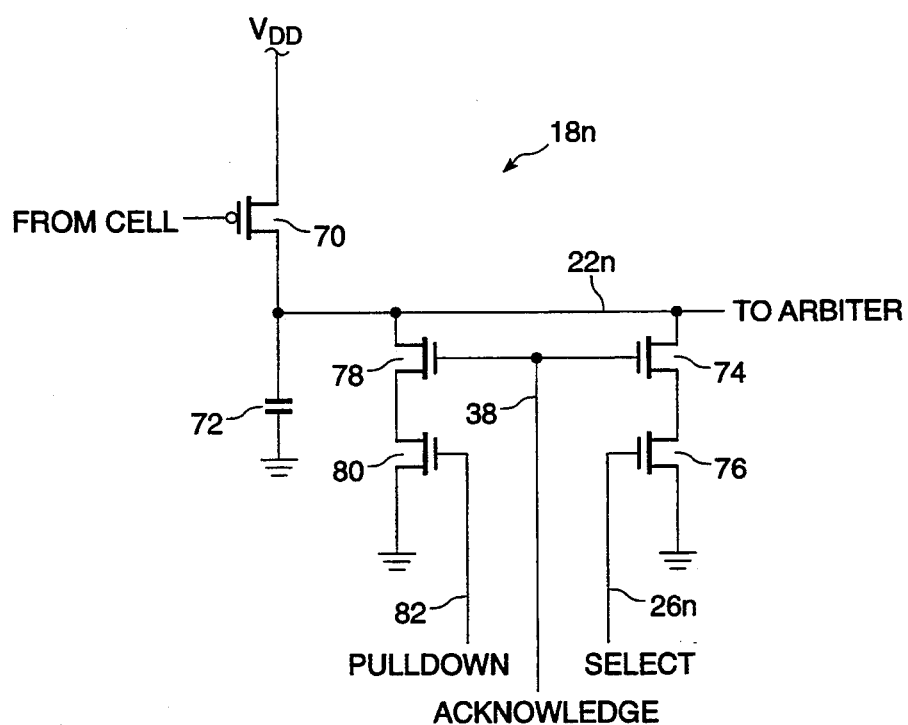
FIG. 3 is a schematic diagram of a send-initiate circuit according to a presently preferred embodiment of the invention.

Referring now to FIG. 3, a schematic diagram of a send-initiate circuit 18n according to a presently preferred embodiment of the invention is presented. As previously described with reference to FIG. 1, there is one send-initiate circuit associated with each event-generating cell in the array in the transmitting integrated circuit 10.

Send-initiate circuit 18n comprises a P-channel MOS transistor 70 having its source connected to voltage source $V_{DD}$, its gate connected to the output of inverter 64 in event-generating cell 12n, and its drain connected to one plate of capacitor 72. The other plate of capacitor 72 is connected to a voltage source such as ground. The common connection of the drain of P-channel MOS transistor 70 and capacitor 72 is connected to request-to-send line 22n.

Once event-generating cell 12n indicates an event has occurred by its output going low, P-channel MOS transistor 70 is turned on, thus charging capacitor 72 to $V_{DD}$. This action changes the state of request-to-send signal output signal on request-to-send line 22n from its reset state to its set state, indicating a request to send information identifying the occurrence of an event in event-generating cell 12n. This line stays set until capacitor 72 is discharged.

Two mechanisms are provided for discharging capacitor 72 to reset the send-initiate signal, depending on whether or not arbiter circuit 24 has selected event-generating cell 12n. N-channel MOS transistors 74 and 76 are connected in series between request-to-send line 22n and ground. The gate of N-channel MOS transistor 74 is connected to common acknowledge line 38 and the gate of N-channel MOS transistor 76 is connected to SELECT line 26n from arbiter circuit 24. Similarly, N-channel MOS transistors 78 and 80 are connected in series between request-to-send line 22n and ground. The gate of N-channel MOS 78 is connected to common acknowledge line 38 and the gate of N-channel MOS transistor 80 is connected to a PULLDOWN line 82. PULLDOWN line 82 is connected to a source of bias voltage.

If the event-generating cell 12n has not been selected by arbiter circuit 24, select line 26n will be held high and N-channel MOS transistor 76 will be turned on when ACKNOWLEDGE signal is asserted and line 38 goes high. Transistors 70, 74, and 76 are sized relatively to one another such that, with both transistors 74 and 76 turned on, capacitor 72 will be discharged even though P-channel MOS transistor 70 is held on by inverter 64 in event-generating cell 12n.

If, however, the event-generating cell 12n has been selected, the bias voltage on pulldown line 82 is set such that pulldown transistor 80 limits the current that the ACKNOWLEDGE signal can apply through transistor 78 and capacitor 72 will not be discharged until the event-generating cell 12n has itself been reset and P-channel MOS transistor 70 is turned off.

Figure 4A:
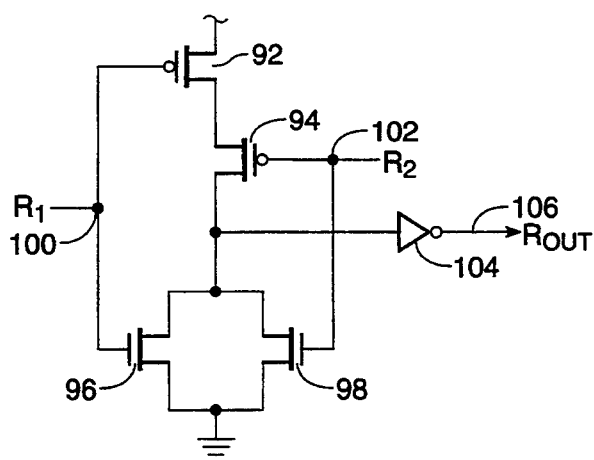
FIGS. 4a–4c are schematic diagrams of an arbiter circuit kernel for use in the present invention.
Figure 4B:
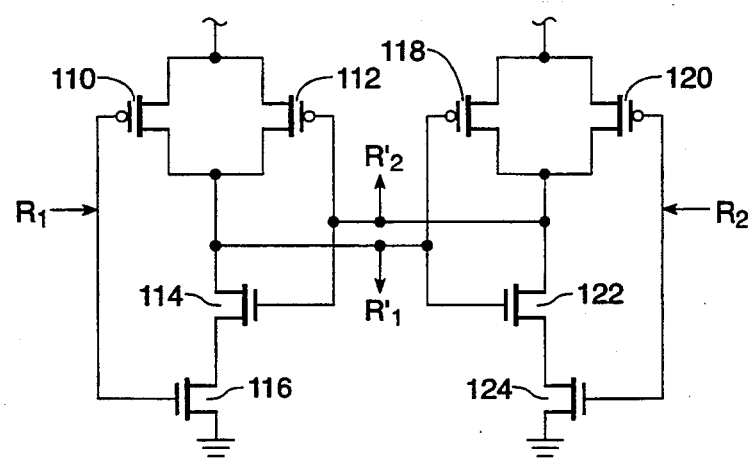
Figure 4C:
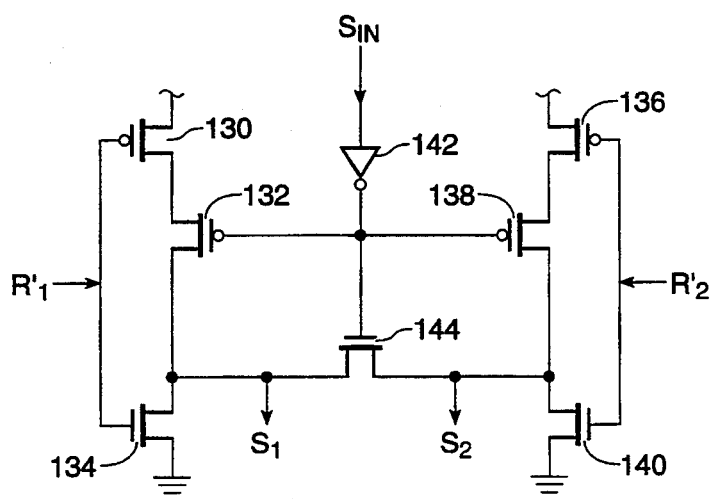

Referring now to FIGS. 4a–4c, a kernel for an arbiter circuit 24 for use in the present invention is shown in schematic diagram form. A binary tree of such arbiter circuits is indicated in block diagram form in FIG. 4d and may be assembled for use with arbitrarily sized array of event-generator cells according to the present invention. To efficiently utilize chip area in the transmitter integrated circuit, the arbiter circuitry is disposed about the periphery of the transmitter integrated circuit chip 10.

Arbiter circuit kernel 90 comprises three circuit portions. The first portion, shown in FIG. 4a, may be an OR gate comprising a series combination of P-channel MOS transistors 92 and 94 connected in series between VDD and the drains of two N-channel MOS transistors 96 and 98 which have their sources connected to ground. The gates of P-channel MOS transistor 92 and N-channel MOS transistor 96 form the first input node 100 and the gates of P-channel MOS transistor 94 and N-channel MOS transistor 98 form the second input node 102. The first and second input nodes 100 and 102 receive request-to-send output signals from a pair of event generating cells 12. The common connection of the drains of P-channel MOS transistor 94 and N-channel MOS transistors 96 and 98 is connected to the input of inverter 104, whose output at node 106 is the request signal propagated to the next level of the tree if either incoming request is activated. If the arbiter kernel is at the top of the tree, output node 106 is the REQUEST output of the entire arbiter circuit.

The second portion of the circuit, illustrated in FIG. 4b, chooses between one of two possible incoming requests. This circuit is composed of a first NAND gate comprising parallel P-channel MOS transistors 110 and 112 in series with N-channel MOS transistors 114 and 116. This first NAND gate is cross-coupled with a second NAND gate comprising parallel P-channel MOS transistors 118 and 120 in series with N-channel MOS transistors 122 and 124. The cross-coupling ensures that only one request will be chosen even if both requests are active. The incoming request-to-send signals are labeled $R_1$ and $R_2$ and are presented, respectively, to the commonly-connected gates of P-channel MOS transistor 110 and N-channel MOS transistor 116 and P-channel MOS transistor 120 and N-channel MOS transistor 124. The lines indicating which request has been chosen are labelled $R'_1$ and $R'_2$ and are the cross coupling nodes of the NAND gates. Unlike the request lines $R_1$ and $R_2$, the chosen variables $R'_1$ and $R'_2$ are active when they are at a low voltage. If $R'_1$ is low, it indicates that $R_1$ has been chosen by this arbiter kernel.

The third portion of the circuit, illustrated in FIG. 4c, directs the select signal coming from the next downstream level of the tree to the descending select output corresponding to the chosen request. This circuit acts as a differential amplifier whose power is turned on by the incoming select. The chosen variable that is in the more active state will drive the corresponding select signal high.

The third circuit portion in FIG. 4c is a symmetrical circuit. P-channel MOS transistors 130 and 132 and N-channel MOS transistor 134 are connected in series between the voltage rails. Similarly, P-channel MOS transistors 136 and 138 and N-channel MOS transistor 140 are connected in series between the voltage rails. The gates of P-channel MOS transistor 130 and N-channel MOS transistor 134 are connected together to the $R'_1$ signal from the circuit of FIG. 4b. The gates of P-channel MOS transistor 136 and N-channel MOS transistor 140 are connected together to the $R'_2$ signal from the circuit of FIG. 4b. Inverter 142 has an input $S_{IN}$ supplied from one of the $S_1$ or $S_2$ outputs of the next downstream arbiter kernel and an output connected to the gates of P-Channel MOS transistors 132 and 138 and the gate of N-channel MOS transistor 144 connected between the common drain connection of MOS transistors 132 and 134 and the common drain connection of MOS transistors 138 and 140. Outputs $S_1$ or $S_2$ are at the drains of N-channel MOS transistors 134 and 140.

Table 1 shows the eight possible signal states for the arbiter kernel 90.

TABLE 1

| $R_1$ | $R_2$ | $S_{IN}$ | $R'_1$ | $R'_2$ | $S_1$ | $S_2$ | $R_{OUT}$ |
|---|---|---|---|---|---|---|---|
| 0 | 0 | 0 | 1 | 1 | 0 | 0 | 0 |
| 0 | 1 | 0 | 1 | 0 | 0 | 0 | 1 |
| 1 | 0 | 0 | 0 | 1 | 0 | 0 | 1 |
| 1 | 1 | 0 | 0 | 1 | 0 | 0 | 1 |
| 1 | 1 | 0 | 1 | 0 | 0 | 0 | 1 |
| 0 | 0 | 1 | 1 | 1 | 0 | 0 | 0 |
| 0 | 1 | 1 | 1 | 0 | 0 | 1 | 1 |
| 1 | 0 | 1 | 0 | 1 | 1 | 0 | 1 |
| 1 | 1 | 1 | 0 | 1 | 1 | 0 | 1 |
| 1 | 1 | 1 | 1 | 0 | 0 | 1 | 1 |

Figure 4D:
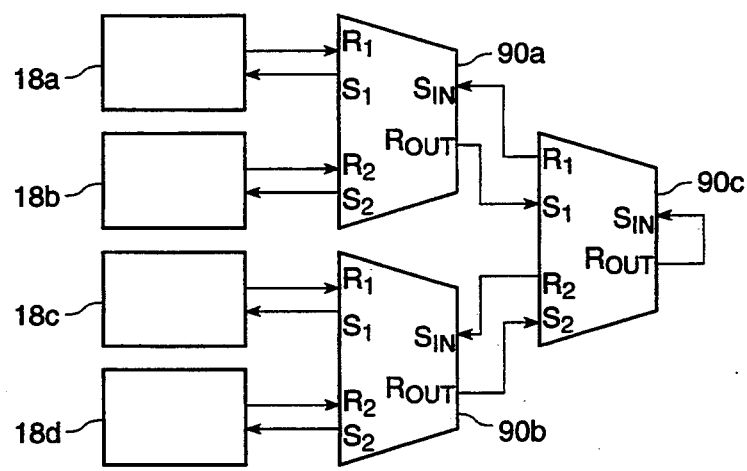
FIG. 4d is a block diagram of an arbiter circuit comprising a plurality of the arbiter kernels of FIGS. 4a–4c which may be employed in the present invention.

Referring now to FIG. 4d, it may be seen that arbiter circuit kernels 90 shown in FIGS. 4a–4c may be hierarchically cascaded to accommodate different numbers of event-generating cells. As may be seen from FIG. 4d, each arbiter kernel receives two send-initiate lines from send request circuits and sends a single request line to the next level of the tree. Each kernel receives a single select line from the immediate downstream level of the tree and sends two select lines to the immediate upstream level.

For the four cell array in FIG. 1, comprising cells 12a–12d, a pair of two-input arbiter kernels 90a and 90b are used in a first level. The $R_1$ and $S_1$ input and output of arbiter kernel 90a are connected to send-initiate circuit 18a and its $R_2$ and $S_2$ input and output are connected to send-initiate circuit 18b. The $R_1$ and $S_1$ input and output of arbiter kernel 90b are connected to send-initiate circuit 18c and its $R_2$ and $S_2$ input and output are connected to send-initiate circuit 18d.

A second arbiter kernel level employs kernel 90c and arbitrates between the winners of the 12a and 12b pair and the 12c and 12d pair of cells. Those of ordinary skill in the art will recognize that for a linear array comprising N event-generator cells, a total of N−1 arbiter kernels will be needed.

The interaction between the choosing circuit and the select steering circuit is the crux of safe arbitration. The problem is to prevent a select from propagating down the tree before a clear choice has been made. Since the OR gate that issues a request to the higher level of the tree can do so while the choosing circuit is hung in a metastable (and undecided) state, it is possible that the select could be issued before the choice has been made. The select can be kept from propagating down the tree if the choice lines do not cross threshold while the choice circuit is in its metastable state. Even when SIN is active, the outputs $S_1$ and $S_2$ must be low when $R'_1$ is equal to $R'_2$. ($R'_1$ equal to $R'_2$ is the metastable state of the cross-coupled NAND gates. This condition can be met by making transistors 134/140 strong relative to transistors 130/136 and/or making transistors 112/120 wide relative to transistors 114/122. Using conservative estimates, it has been calculated that safe arbitration can be achieved if transistors 112/118 are six times stronger than transistors 114/122.

In the forward phase of the data transfer cycle, the requests propagate from the lowest level of the tree to the top. At the top level of the tree, the outgoing REQUEST signal is tied to the incoming SELECT signal. This signal is the Request that goes to the receiver chip. When the select propagates back to the bottom level of the tree, the selected address is placed on the data bus. In the reset phase of the data transfer cycle, the send-initiate cells are reset at the lowest level of the tree by the Acknowledge from the receiver. When both of the requests coming into an arbiter kernel are off, the select signal does not pass through that kernel. Therefore, the select to the event-generating cell is inactivated before the state of the whole arbiter has been reset. Only when the reset of the requests has propagated to the top of the tree will the request to the receiver be terminated. If the acknowledge from the receiver remains active until the request has been terminated, the state of the system is fully reset at the end of a data transfer cycle.

Although the arbitration is not fair, each event-generating cell is acknowledged eventually if the refractory period of a event-generating cell is longer than the data transfer period multiplied by the number of event-generating cells sharing the bus. It has been demonstrated that information from system of the present invention can be transmitted at rates of 2 million addresses per second. If a typical event-generating cell had a peak firing rate of 200 spikes per second, 10,000 event-generating cells simultaneously firing at peak rates could share the same bus. In a silicon retina embodiment of the present invention, this communication framework takes advantage of the abstraction of the visual image computed by the retina. The silicon retina transmits information only from areas in the image where there is spatial and/or temporal change in the image. For this reason, areas of uniform illumination do not contribute to the communication load. In contrast, raster-scanning mechanisms sample these areas regardless of whether there is information present or not. In addition, the self-timed nature of the communications framework minimizes temporal aliasing. Events are transmitted as they occur, not when the raster scan selects them.

At low data rates, the bandwidth of the bus is completely devoted to accurate transmission of event timing. The preservation of event timing is crucial in auditory localization, and is significant in visual motion processing. It is believed that the address-event representation will have many advantages when used in future artificial neural systems. By preserving the integrity of individual action potentials, information may be captured in the detailed dynamics of the network.

Figure 5A:
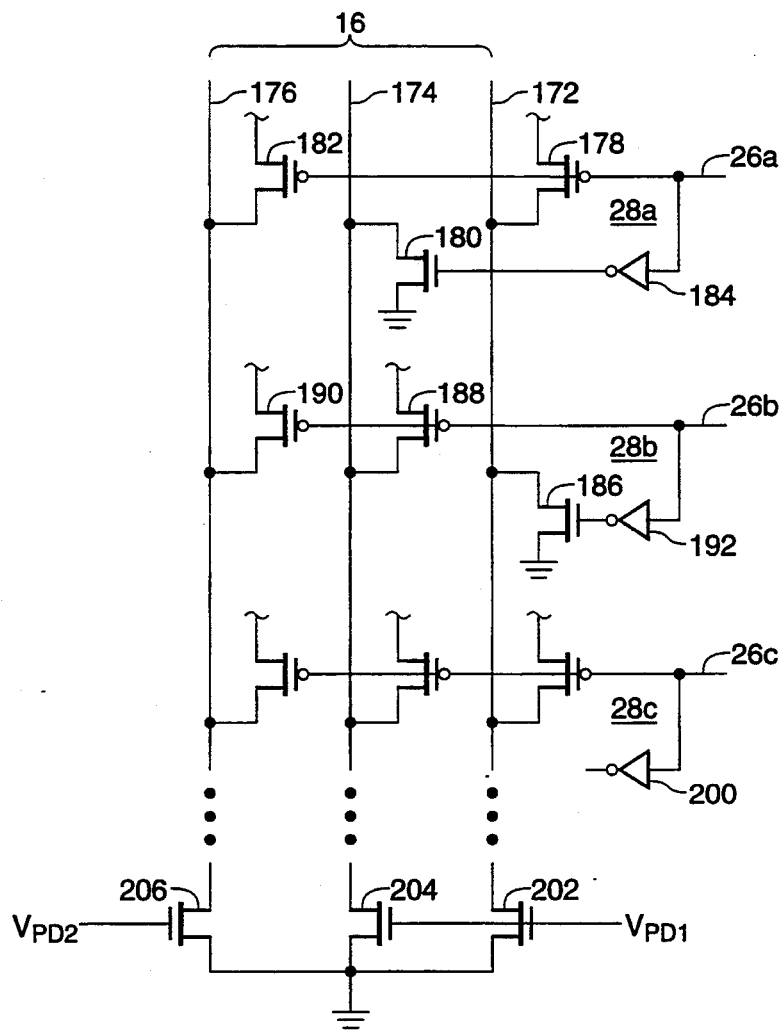
FIG. 5a is a schematic diagram of an address generating circuit according to a presently preferred embodiment of the invention.

Referring now to FIG. 5a, a schematic diagram of a presently preferred address circuit architecture is presented. In the illustrative example of FIG. 5a, an address line including two address bits and a data-ready bit is shown connected to three address circuits 28a, 28b and 28c associated with send-initiate circuits 18a, 18b, and 18c, respectively. Those of ordinary skill in the art will readily understand how to construct an address circuit of arbitrary size.

Output bus 16 includes address lines 172 and 174 and data-ready line 176. Address circuit 28a comprises P-channel MOS pullup transistor 178 connected between VDD and address line 172, N-channel MOS pulldown transistor 180 connected between address line 174 and ground, and P-channel MOS pullup transistor 182 connected between VDD and data-ready line 176. The gates of P-channel pullup transistors 178 and 182 are connected to active-low SELECT line 26a and the gate of N-channel pulldown transistor 180 is connected to an active-high signal derived from SELECT line 26a through inverter 184.

Similarly, address circuit 28b comprises P-channel MOS pullup transistor 178 connected between $V_{DD}$ and address line 172, N-channel MOS pulldown transistor 180 connected between address line 174 and ground, and P-channel MOS pullup transistor 182 connected between $V_{DD}$ and data-ready line 176. The gates of P-channel pullup transistors 188 and 190 are connected to active-low SELECT line 26b and the gate of N-channel pulldown transistor 186 is connected to an active-high signal derived from SELECT line 26a through inverter 192. Address circuit 28c comprises P-channel MOS pullup transistor 194 connected between $V_{DD}$ and address line 172, P-channel MOS pullup transistor 196 connected between $V_{DD}$ and address line 174, and P-channel MOS pullup transistor 198 connected between $V_{DD}$ and data-ready line 176. The gates of P-channel pullup transistors 194, 196 and 198 are connected to active-low SELECT line 26c. Inverter 200 is unused since there are no N-channel pulldown transistors in address circuit 18c.

According to the presently preferred embodiment of the invention, address lines 172 and 174 and data-ready line 176 are connected to ground through N-channel MOS pulldown transistors 202, 204, and 206, respectively. The gates of pulldown transistors 202 and 204 are connected together to a bias voltage $V_{PD1}$ and the gate of pulldown transistor 206 is connected to a bias voltage $V_{PD2}$. This assures that when no cell is selected and no address is asserted on the bus, it contains the defined null address 00. The voltages $V_{PD1}$ and $V_{PD2}$ are chosen such that the pulldown current of transistor 206 is stronger than the pulldown currents of transistors 202 and 204. This assures that the settling time of the data-ready line 176 is slower than the settling times of the address lines 172 and 174 to compensate for differences in the settling times of the individual address lines. By the time the data-ready line goes high, the address bits have settled.

Figure 5B:
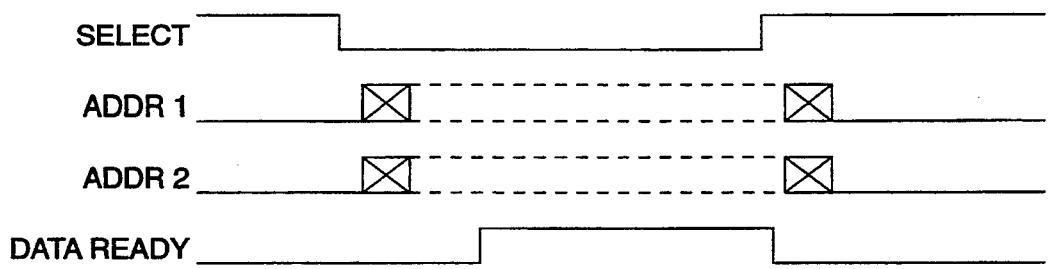

The operation of the address circuits 18a-18c is illustrated in the timing diagram of FIG. 5b. As can be seen from FIG. 5b, the data-ready signal is true only after the address bits on lines ADDR 1 and ADDR 2 have settled.

Figure 6:
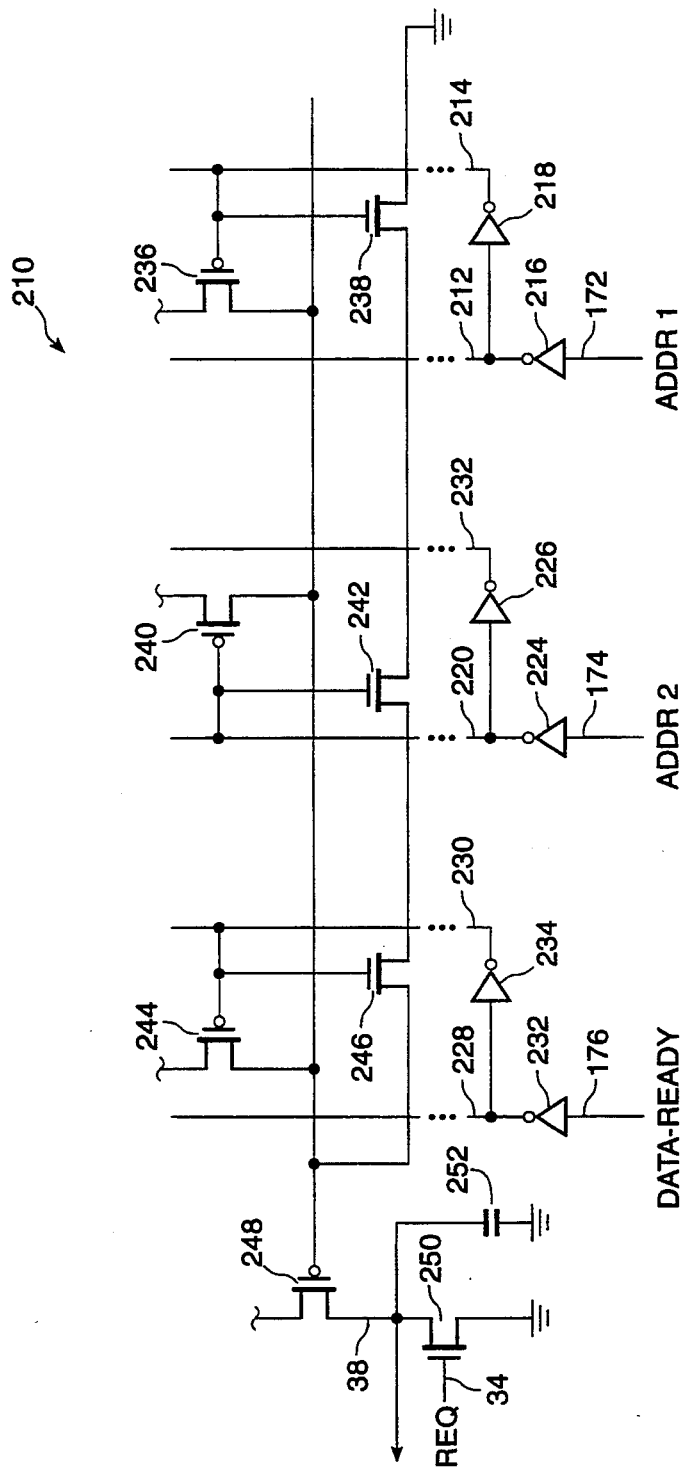
FIG. 6 is a schematic diagram for a typical address decoder circuit, along with acknowledge generating circuitry for use in the functional circuitry of a receiver integrated circuit.

Referring to FIG. 6, a schematic diagram for a typical address decoder circuit, along with acknowledge generating circuitry 36 for use in the functional circuitry 32 of receiver integrated circuit 14. The circuit of FIG. 6 is configured to decode the address 01.

The ADDR1, ADDR2, and DATA-READY lines (lines 172, 174, and 176 of output bus 16) are presented as inputs to address decoder/acknowledge driver circuit 210. The ADDR1 line is used to derive a LSB line 212 and a LSB! line 214 using inverters 216 and 218. Similarly, ADDR2 line is used to derive a MSB line 220 and a MSB! line 222 using inverters 224 and 226, and the DATA-READY line is used to derive a DATA-VALID line 228 and a DATA-VALID! line 230 using inverters 232 and 234. Each address bit utilizes a P-channel pullup transistor and an N-channel transistor. The ADDR1 bit uses P-channel pullup transistor 236 and N-channel transistor 238. The ADDR2 bit uses P-channel pullup transistor 240 and N-channel transistor 242. The DATA-READY signal uses P-channel pullup transistor 244 and an N-channel transistor 246. Each P-channel pullup transistor and N-channel transistor pair have their gates tied together and appropriately connected to one of the complementary pair of lines associated with that bit position.

To sense a zero in the LSB position, the gates of transistors 236 and 238 would be connected to line 212 and, to sense a one in the LSB position (as shown in FIG. 6), the gates are connected to line 214. The DATA-READY transistors 244 and 246 of all address decoders are connected to line 230 for a positive true DATA-READY signal. The drains of all P-channel pullup transistors and the drain of N-channel MOS transistor 246 are connected to the gate of P-Channel Acknowledge transistor 248, which has its source connected to $V_{DD}$ and its drain connected to the drain of N-Channel MOS transistor 250. The source of N-Channel MOS transistor 250 is connected to ground and its gate is connected to the REQUEST signal output 24 from the transmitting integrated circuit. The common drain connection of transistors 248 and 250 form the ACKNOWLEDGE signal output node 38. A capacitor 252 is connected between the ACKNOWLEDGE signal output node 38 and ground. When the gate of P-channel Acknowledge transistor 248 goes low, the ACKNOWLEDGE signal goes high, charging capacitor 252. Capacitor 252 holds the ACKNOWLEDGE signal high regardless of the condition of the gate of P-Channel MOS Acknowledge transistor 248 until the REQUEST signal goes high, signaling that arbiter circuit 24 has been reset.

Figure 7:
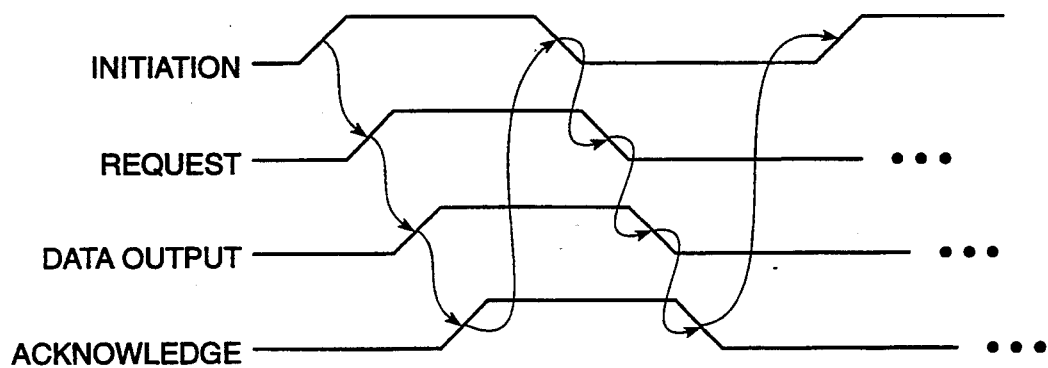
FIG. 7 is a timing diagram illustrating the communications protocol of the present invention in the one-dimensional case.

Referring now to FIG. 7, a timing diagram illustrates the timing dependencies of the SEND-INITIATE, ARBITER-REQUEST, DATA VALID, and ACKNOWLEDGE signals used in the communications protocol of the present invention in the one-dimensional case. From FIG. 7 it may be seen that the entire data transmission process may be accomplished in a short amount of time.

When all of the SEND-INITIATE nodes have been reset, the arbiter re-initializes itself by withdrawing the SELECT signal and the REQUEST signal, indicating that there is no data transfer in progress, when the SELECT signal is withdrawn, the data is removed from the bus, although the ACKNOWLEDGE is no longer pulled up, it will remain high until it is pulled down. The function of the arbiter ensures that the REQUEST signal will not be terminated before the select is withdrawn. When the REQUEST signal is withdrawn, the state of the entire arbiter has been initialized. At this point, the data transfer cycle is completed, the ACKNOWLEDGE goes low and the SEND-INITIATE nodes can once again be activated by the event-generating cells.

According to another aspect of the present invention, a two-dimensional array of event-generator cells may transmit event data according to the communications protocol of the present invention. The generalization of the data transfer protocol is more difficult for the two dimensional sender. The selection of the event-generating cell which will transmit its address must be coordinated in both the X and Y dimensions. If there were two contending cells, $(x_1, y_1)$ and $(x_2, y_2)$, and the arbitration in the two dimensions were allowed to proceed independently, two "ghost events" at $(x_1, y_2)$ and $(x_2, y_1)$ might be erroneously transmitted. In order to avoid this problem, arbitration in the two dimensions proceeds sequentially, and the address asserted on the output bus has an X component and a Y component.

Figure 8:
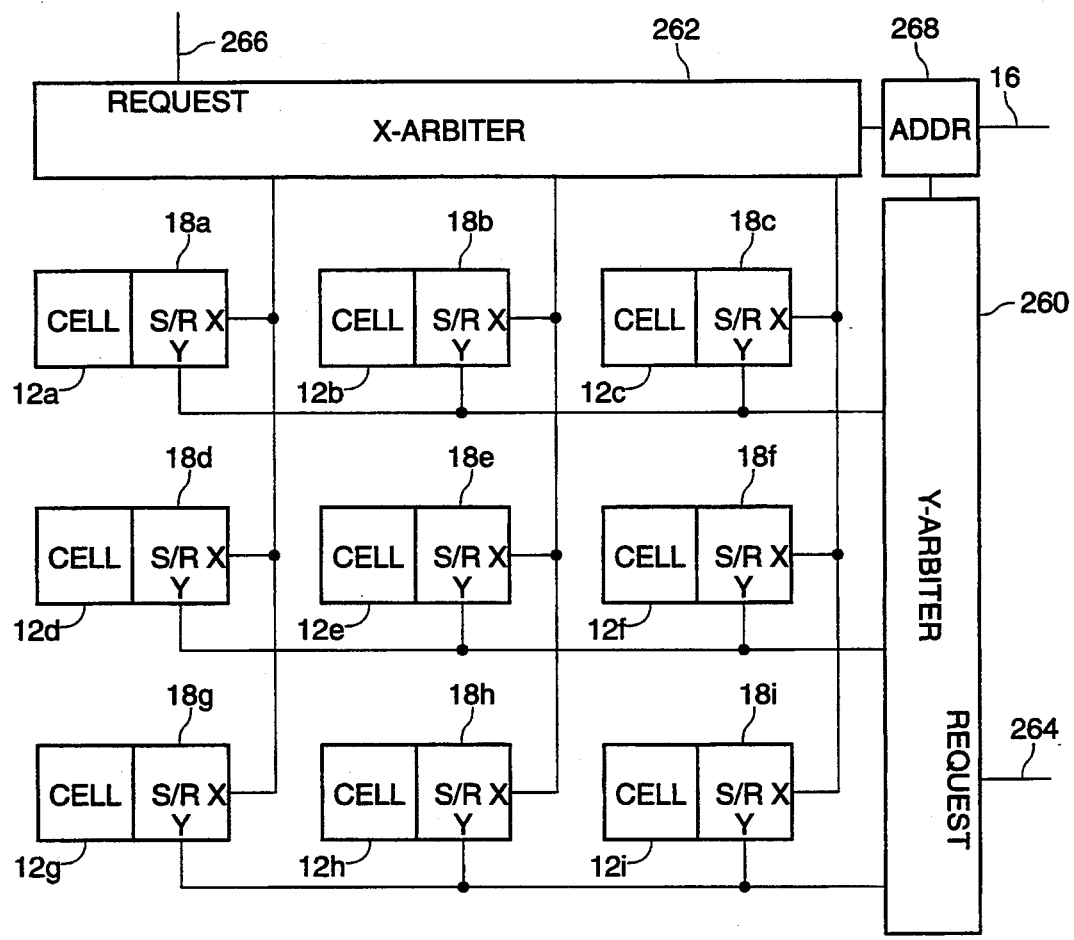
FIG. 8 is a block diagram illustrating an architecture comprising a two-dimensional array of event-generating cells configured to implement the inter-chip communication scheme of the present invention.

Referring now to FIG. 8, a two-dimensional array of event-generating cells and associated transmitting circuitry is shown in block diagram form. An array of nine event-generating cells 12a–12i are shown arranged in a first row 12a, 12b, and 12c, a second row 12d, 12e, and 12f, and a third row 12g, 12h, and 12i and a first column 12a, 12d, and 12g, a second column 12b, 12e, and 12h, and a third column 12c, 12f, and 12i of event-generating cells. Send-initiate circuits 18a–18i are associated with event-generating cells 12a–12i, respectively. According to a presently preferred embodiment of the invention, send-initiate circuits 18a–18i each have an X (column) component and a Y (row) component. Send-initiate requests are generated and reset separately in two dimensions.

Arbiter circuits like those of the single dimension embodiment are also employed in the two-dimensional embodiment of the present invention. A Y (row) arbiter circuit 260 has inputs corresponding to each row of the array. Each input is connected to the Y SEND-INITIATE outputs of the send-initiate circuits in its row. An X (column) arbiter circuit 262 has inputs corresponding to each column of the array. Each input is connected to the X outputs of the send-initiate circuits in its column. Row arbiter circuit 260 and column arbiter circuit 262 have respective REQUEST outputs 264 and 266. These outputs may be ANDed to produce a composite REQUEST signal for the receiver integrated circuit. Row arbiter circuit 260 and column arbiter circuit 262 are each connected to an address-generating circuit 268 which generates X and Y components of the address of a selected event-generating cell onto data bus 16 in response to signals from the arbitrators. The SELECT outputs of the row and column arbiter circuits 260 and 262 are communicated to the all of the send-initiate circuits 18a–18i associated with the appropriate row/column of the array. For simplicity, the common row lines and column lines to which the send-initiate circuits 18a–18i are connected are shown in FIG. 8 as single lines. However, those of ordinary skill in the art will recognize that each row and column line comprises a request-to-send line to the arbiter circuit and a ROW-SELECT or COLUMN-SELECT line output from the row or column arbiter circuit.

The Y components of the send-initiate circuits 18a–18i may comprise the circuits depicted in FIG. 3. The Y component of the initiation and reset process is the same as described for the one-dimensional embodiment.

Figure 9:
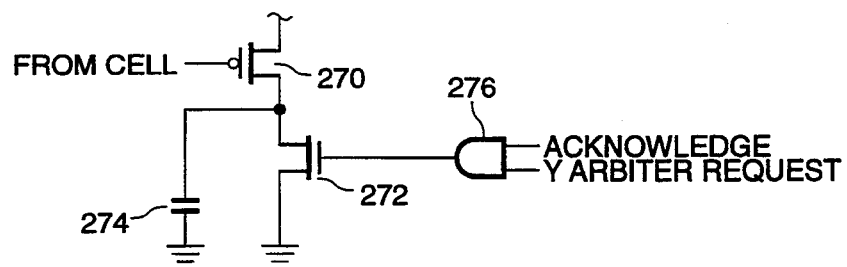
FIG. 9 is a schematic diagram of a send-initiate circuit which may be employed in the two-dimensional embodiment of the present invention.

The X components of the send-initiate circuits 18a–18i may be the circuit shown in FIG. 9, including P-Channel MOS transistor 270 having its source connected to $V_{DD}$, its drain connected to the drain of N-Channel MOS transistor 272, and its gate connected to the output node 20 of the event-generating cell. Capacitor 274 is connected between the drains of transistors 270 and 272 and ground. The gate of N-Channel MOS transistor 272 is connected to the output of AND gate 276, having a first input connected to the ACKNOWLEDGE signal node 38 and a second input connected to the Y REQUEST output 264 of Y arbiter 260.

The receiving circuitry in the receiver integrated circuit may be identical to that of the receiving integrated circuit for the one dimensional embodiment of the invention. The gate of N-Channel MOS transistor 250 in the acknowledge circuit portion of FIG. 6 is connected to the REQUEST output 266 of column arbiter 262 in the two-dimensional embodiment. The ACKNOWLEDGE signal is developed as disclosed for the one-dimensional embodiment of the invention.

The data transfer process is initiated by an event-generating cell. The initiation process is sequential, occurring first in the vertical (row), then in the horizontal (column) dimension. When the data processing circuitry inside an event-generating cell decides that it would like to transmit an event, it pulls up on the common row SEND-INITIATE line which runs the length of the row. If that row is selected by the vertical arbiter, the ROW-SELECT signal on that row is activated and the y-dimension address bits of that row are placed on the bus by the address-generating circuit 268.

In the second stage of the initiation cycle, the horizontal arbiter selects a requesting event-generating cell on the row that was just selected by the vertical arbiter and activates the appropriate OOLUMN-SELECT line. The x-dimension address bits are placed on the bus by the address-generating circuit 268. The completed address can then be decoded by the receiver.

Figure 10:
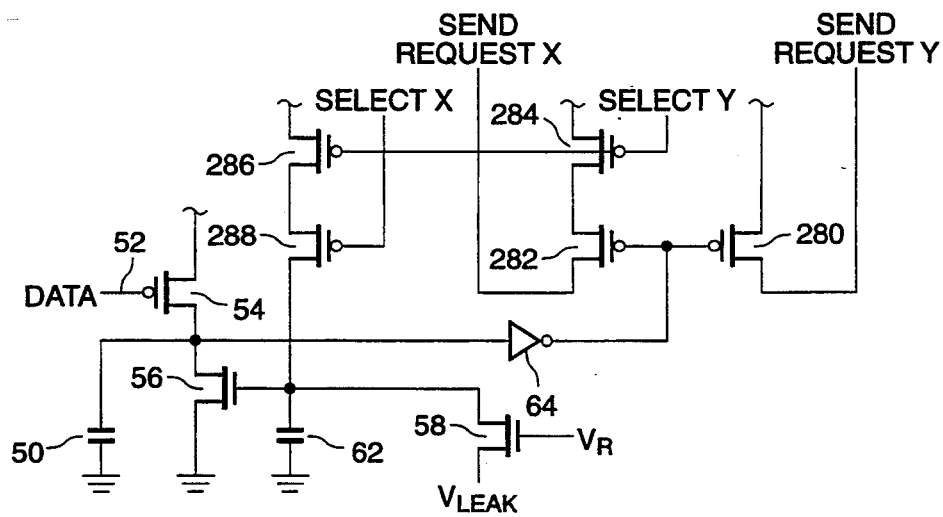
FIG. 10 is a schematic diagram of a typical event-generating cell which may be employed in the two-dimensional embodiment architecture of FIG. 8.

Referring now to FIG. 10, a schematic diagram of an event-generating cell for the two-dimensional embodiment of the invention is depicted. The event-generating cell operates in much the same manner as the event-generating cell of FIG. 2 with differences necessary to accommodate the two-dimensional nature of the selection process. Like elements of the event-generating cells of FIGS. 2 and 10 will be given the same reference numerals.

As in the event-generating cell depicted in FIG. 2, the state variable is the voltage set on capacitor 50. This state variable integrates the input data at the DATA input node 52 through P-channel MOS transistor 54 with a time constant set by the capacitance of capacitor 50 and N-channel MOS transistor 56 controlled by the voltage $V_{Leak}$ on the source of N-channel MOS transistor 58. Those of ordinary skill in the art will recognize that the DATA "signal" at the gate of P-channel MOS transistor 54 may be generated by one of any number of sources known to those skilled in the art of neural circuits.

The sending of a SEND-INITIATE signal and the resetting of the event-generating cell of FIG. 10 is more complex than the performance of those tasks in the event-generating cell of FIG. 2 because of the extra dimension. Once the event-generating cell of FIG. 10 has triggered inverter 64 to change state, Y send-initiate P-channel MOS transistor 280 turns on. Its drain is connected to the row send-initiate line and informs the row arbiter 260 that a request to send is pending. The output of inverter 64 is also coupled to the gate of X send-initiate P-Channel MOS transistor 282. Its drain is connected to the column-send initiate line. Transistor 282 is connected in series with select-y P-Channel MOS transistor 284 and therefore cannot activate the column-send initiate line to the column arbiter circuit 262 until the row containing this event-generating cell has been selected by the row arbiter 260 pulling the SELECT-Y signal low. As in the event-generating cell of FIG. 2, the internal reset of the event-generating cell of FIG. 10 is accomplished by charging capacitor 62. However, in the two dimensional embodiment, coincidence of the SELECT-X and SELECT-Y signals is required to turn on both of P-Channel reset transistors 286 and 288 is required. The coincidence of these SELECT signals makes the event-generating cell refractory for a time period set by refractory capacitor 62 and the refractory voltages at the gate and source of MOS transistor 58.

Once a particular event-generating cell has been X and Y selected, it is internally reset and its X and Y address is placed on the address bus 16. The ACKNOWLEDGE signal from the receiver integrated circuit first resets all of the Y components of the send-initiate circuits 18a–18i. This action in turn causes the REQUEST line 264 to change state. This action, ANDed with the ACKNOWLEDGE signal, causes reset of the X components of the send-initiate circuits 18a–18i.

Figure 11:
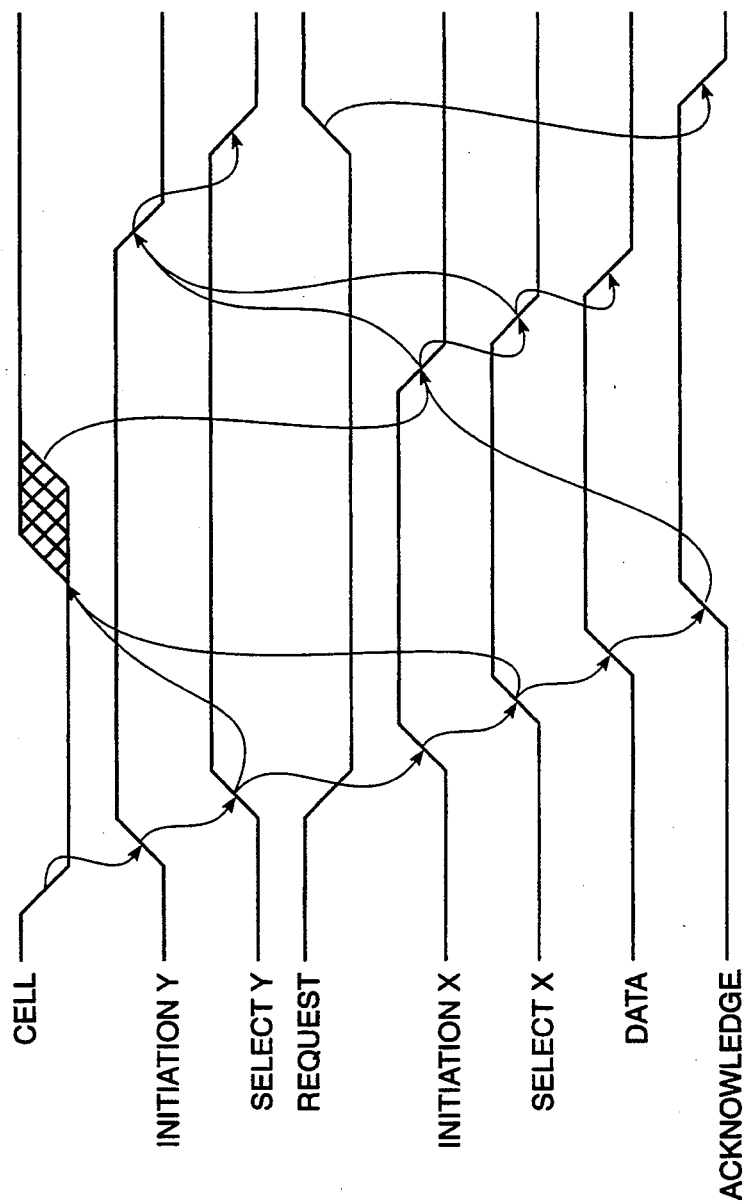
FIG. 11 is a timing diagram showing the timing of signals in the data transmission protocol of the present invention in two dimensions.

FIG. 11 shows the timing of signals in the data transmission protocol of the present invention in two dimensions.

There are more possible reset protocols for the arbiter in the two-dimensional system than there were in the one-dimensional system. An extremely conservative protocol, which resets the state of the entire system, including all of the intermediate nodes in both the horizontal and vertical arbiter trees after each data transfer cycle, is implemented herein. However, as those of ordinary skill in the art will recognize, more temporally efficient mechanisms are possible. These and other obvious variations thereof are to be considered equivalent to the protocol disclosed herein.

One hypothetical protocol would not reset the selected row of the vertical (row-selecting) arbiter until all of the event-generating cells making column requests had transmitted their data. This sequence is necessary so that the proper x and y-addresses remain associated. Only the selected column and row initiation nodes would be reset, and they would be reset with weak N-Channel transistors 78 (FIG. 3) so that the event-generating cells would have to transmit before their initiation nodes could be reset. This protocol has the disadvantage that one row might control the bus indefinitely if it had a persistently active event-generating cell on it.

An alternative arbiter reset protocol entails resetting the entire horizontal (column-selecting) arbiter and resetting only the selected row. The vertical arbiter 260 would be forced to choose a new row and the initiation nodes of the horizontal arbiter 262 would be reset so that the new row could enter into fresh competition. The address stream would be punctuated by the reset of the horizontal arbiter 262, which would toggle the request to the receiver integrated circuit. The selected vertical arbiter initiation node could be reset by the ACKNOWLEDGE signal, which would also reset all of the horizontal arbiter initiation nodes. If necessary, the method of resetting the initiation nodes used in the one-dimensional case could be applied to the reset of the horizontal arbiter because the selected row is essentially a one-dimensional system. This reset mechanism would be faster than the one that is disclosed herein because the partial state of the vertical arbiter tree would be conserved. In light of present experience, this protocol appears to be preferable to the one described in detail herein.

In the implemented system, all of the initiation nodes of the vertical arbiter are forcefully reset by the AND of the horizontal arbiter top-level request, indicating that all of the column-initiation lines have been reset, and the ACKNOWLEDGE. It is not necessary, nor is it possible, to determine at this point whether or not the internal state of the selected pixel has been reset. This determination is made previously in the reset protocol by the horizontal arbiter reset, as described in the one-dimensional case. When the vertical arbiter has been reset, the withdrawal of the request pulls down the Acknowledge and completes the data transfer cycle. The reset of the initiation lines is terminated and the event-generating cells are free to reinitiate requests at the base of the vertical arbiter tree.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. In an integrated circuit, for use in a neuromorphic system, apparatus for communication of information identifying each occurrence of multiple random events from a plurality of initiators across a single bus to a receiver which generates a separate acknowledge signal in response to receipt of said information of each of said events, comprising:

a plurality of event generators disposed on the integrated circuit, each of said event generators having only two states which include a first no-event-occurred state and a second event-occurred state;

a send-initiate circuit, associated with each of said event generators, for changing a request-to-send signal from a reset state to a set state indicating a request to send information identifying the occurrence of an event in response to said event-occurred state of its associated event generator;

an asynchronous arbiter circuit, coupled to said send-initiate circuit and asynchronously responsive to multiple simultaneously extant request-to-send signals in set states, for sending a single select signal to one event generator in its event-occurred state;

event generator reset means, in each of said event generators, for causing a transition from said second event-occurred state to said first no-event-occurred state in response to said select signal;

address generating means, associated with each of said event generators, for generating a unique address onto the single bus, said unique address identifying its event generator, in response to said select signal; and send-initiate-circuit reset means for placing all said request-to-send signals into reset states in response to each separate acknowledge signal.

* * * * *